United States Patent
Niemela et al.

(10) Patent No.: US 7,307,968 B2
(45) Date of Patent: Dec. 11, 2007

(54) METHOD AND SYSTEM FOR COMMUNICATING DATA BETWEEN A MOBILE COMMUNICATIONS ARCHITECTURE AND A PACKET SWITCHED ARCHITECTURE

(75) Inventors: Tuomas Niemela, Helsinki (FI); Shkumbin Hamiti, Espoo (FI); Risto Mononen, Espoo (FI); Shavantha Kularatna, Flower Mound, TX (US)

(73) Assignee: Nokia Corporation, Espoo (FI)

( * ) Notice: Subject to any disclaimer, the term of this patent is extended or adjusted under 35 U.S.C. 154(b) by 678 days.

(21) Appl. No.: 09/784,954

(22) Filed: Feb. 16, 2001

(65) Prior Publication Data
US 2001/0033563 A1    Oct. 25, 2001

Related U.S. Application Data

(60) Provisional application No. 60/182,936, filed on Feb. 16, 2000.

(51) Int. Cl.
*H04Q 7/00* (2006.01)
(52) U.S. Cl. .................. 370/329; 370/466; 370/474
(58) Field of Classification Search ............... 370/352, 370/328, 329, 465–467, 469, 474, 475, 476, 370/337, 321
See application file for complete search history.

(56) References Cited

U.S. PATENT DOCUMENTS

| | | | |
|---|---|---|---|
| 5,729,537 A * | 3/1998 | Billstrom | 370/329 |
| 6,081,723 A * | 6/2000 | Mademann | 455/456.1 |
| 6,104,929 A * | 8/2000 | Josse et al. | 455/445 |
| 6,317,421 B1 * | 11/2001 | Wilhelmsson et al. | 370/328 |
| 6,636,502 B1 * | 10/2003 | Lager et al. | 370/352 |
| 6,711,143 B1 * | 3/2004 | Balazinski et al. | 370/329 |
| 6,735,634 B1 * | 5/2004 | Geagan et al. | 709/235 |
| 6,904,034 B2 * | 6/2005 | Kularatna et al. | 370/338 |
| 6,920,116 B1 * | 7/2005 | Hossain et al. | 370/329 |
| 6,952,728 B1 * | 10/2005 | Alles et al. | 709/224 |
| 6,996,092 B1 * | 2/2006 | Maguire et al. | 370/356 |
| 7,006,478 B1 * | 2/2006 | Mizell et al. | 370/338 |
| 7,139,828 B2 * | 11/2006 | Alkhatib et al. | 709/230 |
| 2002/0032800 A1 * | 3/2002 | Puuskari et al. | 709/246 |

\* cited by examiner

*Primary Examiner*—Chi Pham
*Assistant Examiner*—Kevin Mew
(74) *Attorney, Agent, or Firm*—Squire, Sanders & Dempsey L.L.P.

(57) ABSTRACT

The method and system provides a data packet encapsulated with protocol data according to an embodiment of the invention. A data packet for communication may be associated with a TLLI and a NSAPI identifying a communications path between a BSS and a SGSN. The method and system provides a BVC associated with the BSS and the SGSN and a NSE that provides communication service to the BVC over NS-VC. The BVC, NSE and NS-VC may be associated with the TLLI and NSAPI. The encapsulated protocol data comprises UDP and IP. UDP provides UDP ports associated with NS-VC. The UDP ports identified as data designated as either real time or non-real time services. IP provides an IP address identifying the NSE providing service to the BVC. The data packet encapsulated with UDP and IP provides for more efficient, flexible and reliable communications between a BSS and a SGSN.

19 Claims, 1 Drawing Sheet

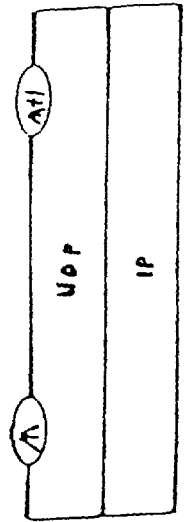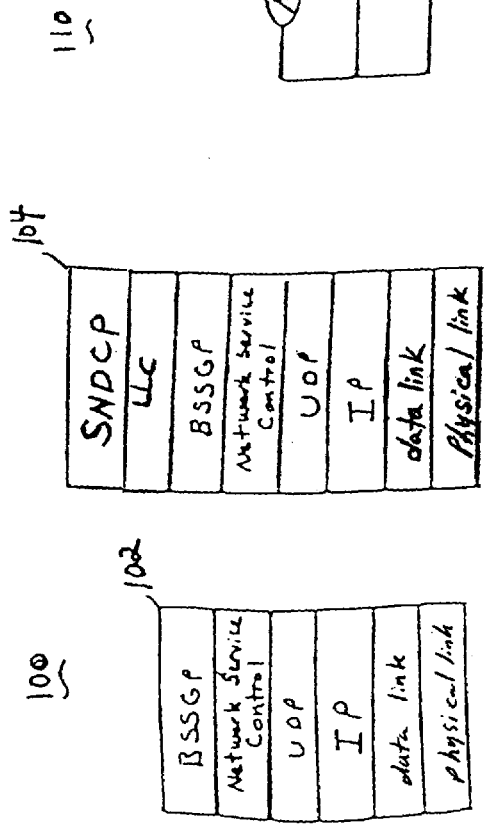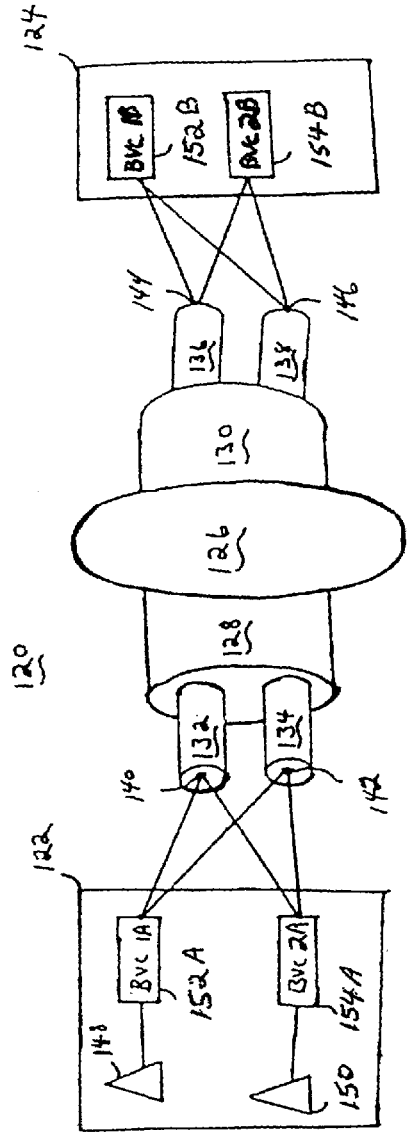

METHOD AND SYSTEM FOR COMMUNICATING DATA BETWEEN A MOBILE COMMUNICATIONS ARCHITECTURE AND A PACKET SWITCHED ARCHITECTURE

This application claims the benefit of Provisional Application No. 60/182,936, filed Feb. 16, 2000.

FIELD OF THE INVENTION

The present invention relates, in general, to a method and system for communicating data between a mobile communications architecture and a General Packet Radio Service (GPRS) architecture and, in particular, to a method and system utilizing a network and transport layer protocol for providing communications between a Base Station System (BSS) and a Serving GPRS Support Node (SGSN).

BACKGROUND OF THE INVENTION

Without limiting the scope of the invention, its background is described in connection with communication protocols defining communication requirements between a mobile communications architecture and a Serving GPRS Support Node (SGSN).

Wireless communication systems, such as a Global Systems for Mobile (GSM) communication architecture, Personal Communications Service (PCS) architecture and Digital Cellular System (DCS) architecture, are mobile communications architectures that enable wireless communication of information, such as speech, control data and Short Message Service (SMS). Data networks, such as the Internet or intranet, are packet switched architectures that enable computers to remotely access services, such as audio, video, graphical or simple text applications, on a remote device.

A General Packet Radio Service (GPRS) architecture allows communication devices, such as a mobile phone, mobile computer or Personal Digital Assistance (PDA), access to services provided on a data network. GPRS is a packet switched architecture that enables communication between a mobile communications architecture and a data network, such as the Internet, intranet or another GPRS network architecture. The GPRS architecture may comprise support nodes coupled to the mobile communications architecture and a Packet Data Network (PDN) where services such as audio, video, or simple text files residing on a server may be accessed, for example, through a router. Standardized protocols define methods of communication between support nodes, the mobile communications architecture, and the PDN.

Data, including user data (i.e. audio, video and text, and signaling data) communicated across different systems, may be appended with protocol data according to industry standardized methods. The protocol data provides the routing and control information necessary to allow two system components to communicate. System components may be directly connected or may be connected through an intermediate network. Data routed between system components may be routed through an intermediate network comprising different networks and sub-networks having intermediate system components. The networks and sub-networks may vary and therefore utilize different communication protocols to transport data.

An application program, such as a file transfer or a mail transfer, to be communicated between two end systems is broken down into individual data packets and encapsulated with protocol data. The encapsulated protocol data may include a physical link layer, a data link layer and network layer. The physical link layer describing the physical properties of the equipment and the transmission medium, the data link layer describing the data structure and relay information for a particular network or sub-network and the network layer providing end to end routing and data integrity functions. An intermediate system of a network or sub-network utilizing a data link layer other than the data link layer of the encapsulated data packet must access the network layer protocol to continue routing. If the data link layer is incompatible and a network layer protocol does not exist, the communication fails.

European Telecommunications Standard Institute (ETSI) GSM 08.16: "Digital cellular telecommunications system (Phase 2+); General Packet Radio Service (GPRS); Base Station System (BSS)-Serving GPRS Support Node (SGSN) interface; Network Service" currently defines the Network Service layer of the Gb interface as utilizing a data link layer to transport data without a network or transport layer protocol. GSM 08.16 currently defines the data link layer as Frame Relay (FR). Therefore, the link and any intermediate system coupling the mobile communications architecture and the GPRS architecture must be FR. The restriction of data transportation between the GPRS architecture and the mobile communications architecture to the data link layer, and more specifically to FR, limits flexibility and may effect reliability.

As may be seen, a method and system for improving data communication between a mobile communications architecture and a GPRS architecture could provide more efficient, flexible and reliable data communications.

SUMMARY OF THE INVENTION

The present invention provides an efficient, flexible and reliable method and system for communicating data between a mobile communications architecture and a GPRS architecture.

In an embodiment, the invention provides a method for communicating data between a Base Station System (BSS) and a Serving GPRS Support Node (SGSN). The method provides a data packet encapsulated with protocol data according to an embodiment of the invention. The data packet may be associated with a Temporary Logical Link Identifier (TLLI) and a Network Service Access Point Identifier (NSAPI). The TLLI and NSAPI may be used to identify a BSS or a SGSN providing communications between a mobile communications device and a device located on a Packet Data Network (PDN). The protocol data comprises a User Datagram Protocol (UDP) and an Internet Protocol (IP) for routing the data packet between the BSS and SGSN according to the TLLI and NSAPI. Utilization of the UDP and IP provides a system having improved efficiency, reliability and flexibility.

The method provides a BSSGP Virtual Connection Identifier (BVCI), a Network Service Entity Identifier (NSEI) and a Link Select Parameter (LSP). The BVCI, NSEI and LSP are associated with the TLLI and NSAPI. The BVCI identifies a BSSGP Virtual Connection (BVC) on the BSS side and the SGSN side. The NSEI identifies a Network Service Entity (NSE) that provides for the routing of data between BVC. The LSP identifies a virtual link providing communication service to the BVC. The protocol data encapsulating the data packet comprises a User Datagram Protocol (UDP) and an Internet Protocol (IP). The encapsulated UDP associates a UDP port with a Network Service-Virtual Connections (NS-VC) of a Network Service Virtual Link (NS-VL). The NS-VC may be identified by the BVCI and NSEI and the NS-VL may be identified by the LSP. A UDP port associated with a NS-VC may be identified as data designated as for real time services, such as audio, or non-real time services, such as simple text messages. IP provides an address for a particular NSE providing service to a BVC. The data packet encapsulated with protocol data may be transmitted and received either over a direct link connecting the BSS and the SGSN or through an intermediate network connecting the SGSN and the BSS.

The method may be implemented within a system for communicating data between a mobile communications architecture and a GPRS architecture. The system comprises a Base Station System (BSS) for providing communications to a geographic area. The BSS comprises a first BSSGP Virtual Connection (BVC) associated with the geographic area. The BSS further comprises at least one Network Service Virtual Connection (NS-VC) associated with the first BVC. The system further comprises a Serving GPRS Support Node (SGSN) coupled to the BSS. The SGSN has a second BVC, the second BVC associated with the first BVC. The SGSN having a second at least one NS-VC associated with the second BVC. The BSS transmits data between the first BVC and the second BVC over the first at least one NS-VC. The data transmitted is encapsulated with UDP and IP. UDP provides a UDP port associated with a NS-VC of the first and second at least one NS-VC. A UDP port may be identified as either real time or non-real time services. IP provides an address identifying a particular NSE providing service to the first and second BVC. The SGSN receives the data over the second at least one NS-VC. Communication between the BSS and SGSN also includes the SGSN transmitting data between the first BVC and the second BVC over the second at least one NS-VC. The transmitted data is encapsulated with a UDP and IP. UDP provides a UDP port associated with a NS-VC of the first and second at least one NS-VC. A UDP port may be identified as either for data designated as non-real time or real time services. IP provides an address identifying a particular NSE providing service to the first and second BVC. The BSS receives data transmitted from the SGSN over the first at least one NS-VC.

BRIEF DESCRIPTION OF THE DRAWINGS

For a more complete understanding of the present invention, including its features and advantages, reference is made to the detailed description of the invention, taken in conjunction with the accompanying drawings of which:

FIG. 1A is a protocol structure for a Gb interface according to an embodiment of the invention;

FIG. 1B is a IP and UDP layer utilized in the Gb interface of FIG. 1A having defined NS-VC for real time and non-real time services; and FIG. 2 is an exemplary block diagram of a mobile communications architecture coupled with a General Packet Radio Service (GPRS) architecture communication according to the Gb interface of FIG. 1A.

DETAILED DESCRIPTION OF THE INVENTION

While the use and implementation of particular embodiments of the present invention are presented in detail below, it will be understood that the present invention provides many inventive concepts, which can be embodied in a wide variety of contexts. The specific embodiments discussed herein are merely illustrative of specific ways to make and use the invention and are not intended to limit the scope of the invention.

Turning now to FIG. 1A, where a protocol structure for a Gb interface according to an embodiment of the invention is illustrated and denoted generally as 100. Gb interface 100 provides a new method of communicating data between a mobile communications architecture, such as a Global System for Mobile (GSM) communications architecture, and a General Packet Radio Service (GPRS) architecture. Gb interface 100 utilizes a network and transport layer protocol to allow for flexible, reliable and efficient data transmission between the mobile communications architecture and the GPRS architecture.

The mobile communications architecture may comprise a Base Station System (BSS) and the GPRS architecture may comprise a Serving GPRS Support Node (SGSN) coupled to the BSS. The BSS and SGSN communicate according to protocols defined by Gb interface 100. Data communicated between BSS and SGSN is in the form of digitized signals referred to as data packets. The data packets are comprised of transmission data including user data (i.e. audio, video or text) and signaling data encapsulated with protocol data comprising address and control information. The protocol data provides for routing, relay and node management functions. The protocol data is encapsulated according to a BSS Gb protocol stack 102 and a SGSN Gb protocol stack 104.

BSS Gb protocol stack 102 comprises a Base Station System GPRS Protocol (BSSGP), a Network Service Entity (NSE) and a physical link layer. SGSN Gb protocol stack 104 comprises a Sub-Network Dependent Convergence Protocol (SNDCP), a Logical Link Control (LLC), a BSSGP, a NSE and a physical link layer. NSE comprises a Network Service Control, a User Datagram Protocol (UDP), Internet Protocol (IP) and a data link layer. The data link layer may be, but not limited to, Frame Relay (FR), Asynchronous Transfer Mode (ATM), Ethernet, Synchronous Optical Network (SONET) or Synchronous Digital Hierarchy (SDH).

A mobile communications device and a SGSN providing service to the mobile communications device creates a context table when accessing a remote device on a PDN. The context table may comprise a mobility management context containing network information relating to mobility or security and a Packet Data Packet (PDP) context providing routing information. The context table may comprise a Temporary Logical Link Identifier (TLLI), a Network Service Access Point Identifier (NSAPI), a PDP address, a PDP type, for example IP or X0.25, and Quality of Service (QoS) associated with a particular PDP address. Each data packet received by Gb interface 100 can be associated with a context table. The context table allows a mobile communications device to identify a SGSN providing service to a particular PON or a SGSN to identify a BSS providing service to that particular mobile communications device.

A data packet received by Gb protocol stack 100 having an associated NSAPI and TLLI is encapsulated and de-capsulated according to BSS Gb protocol stack 102 and SGSN Gb protocol stack 104. Encapsulation simply refers to the addition of address and control information to data. De-capsulation simply refers to the removal of the address and control information to reveal the original data. The TLLI and NSAPI are used for routing the data packet between a mobile communications device and remote device located on a PDN through a BSS and a SGSN. The TLLI and NSAPI identify a logical link between a mobile communications device and a SGSN. The NSAPI identifies a Service Access Point (SAP), for example a SGSN and a GGSN providing service to a PDN, or the NSAPI may identify a context table associated with a PDP address and therefore the TLLI identifying a mobile communications device.

SNDCP provides for the encapsulation and de-capsulation of address and control information to route data packets between peer SNDCP and functions to improve the efficiency of communication between a mobile communications device and a SGSN. The functions include data compression, data segmenting, multiplexing data onto the LLC layer, data re-assembly and data decompression functions. SNDCP may include header stripping and header compression options for RTP/UDP/IP headers. SNDCP receives a data packet having an associated NSAPI and multiplexes the received data packet onto an associated Service Access Point Identifier (SAPI) of the LLC. SAPI identifies SAP associated with a NSAPI. Different NSAPI may be associated with the same SAPI LLC provides logical links identified by the SAPI and determined by the TLLI and NSAPI. LLC provides for sequence control of transmission data, error detection, recovery procedures, notification of unrecoverable errors, flow control and data ciphering. LLC transports the SAPI and TLLI between a BSS and a SGSN.

The BSSGP performs encapsulation and de-capsulation functions providing routing and control information for the efficient routing of data between peer BSSGP. BSSGP provides for down link and up link flow control and node management. BSSGP provides radio related information used by or derived from an RLC/MAC function of a mobile communications device. Control information provided by the BSSGP also provides a BSS and a SGSN with the necessary data to perform node management functions. NSE performs encapsulation and de-capsulation functions providing address and control information for the efficient routing of data between peer NSE. NSE comprising the network service control, UDP, IP and data link layer provides transmission and reception service for the BSSGP, load sharing and virtual circuit management. The transmission path between the BSS and the SGSN may be a single data link or may be through several links traversing an intermediate network. However, utilizing IP provides for the routing of data regardless of the number and type of data links transmitted.

The peer-to-peer communication between remote BSSGP is performed over a BSSGP Virtual Connection (BVC). A BVC Identifier (BVCI) identifies a BVC. The BVCI may be associated with a cell, a Base Station Controller (BSC) or a BSS. A NSE may provide transport service to a group of BVCI. The NSE is identified by a NSEI. The NSEI together with a BVCI uniquely identifies a BVC. Data transported between peer BSSGP that is related to the same mobile communication device is given a Link Select Parameter (LSP) identifying a virtual link directly connecting a BSS and a SGSN or a virtual link connecting one side of a BSS or SGSN and a intermediate network. The BVCI, NSEI and the LSP are associated with a TLLI and a NSAPI and are provided to the NSE.

The NSE comprising network service control, UDP, IP and data link layer provides for peer to peer communication between remote NSE. The NSE provides for the routing of data and for virtual circuit management. The provided NSEI is used to determine Network Service Virtual Connections (NS-VC) that provide service to the provided BVCI. The LSP is used to determine a Network Service Virtual Link (NS-VL) that supports a particular NS-VC. NS-VC is a virtual connection between peer NSE over an NS-VL. Each NS-VC is identified by means of an NS-VC Identifier (NS-VCI). An NS-VL is identified by an NS-VLI. Each physical link supports one or more NS-VL. Each NS-VL is supported by one physical link. For example, in the case of a Frame Relay (FR) network, the physical link is the bearer channel, the NS-VL is the local link of the permanent virtual connection and the NS-VLI is the association of the FR DLCI and bearer channel identifier.

Network service control provides load sharing and NS-VC management. Network service control distributes data among available NS-VC. Network service control provides blocking procedure used by the NSE to inform a peer NSE when an NS-VC becomes unavailable for data transmission. An unblocking procedure is used to remove the blocking restriction after the NS-VC becomes available. A reset procedure is used between peer NSE in order to set an NS-VC to a determined state. A test procedure is used to check that an NS-VC is operating properly between peer NSE.

UDP provides a UDP port associated with NS-VC of an NS-VL. For example, UDP provides a destination and source UDP port associated with NS-VC. A UDP port may be identified as either for data designated as real time or non-real time services. For example, text and graphics may be identified as non-real time services whereas audio would be classified as real time services and therefore would require priority processing. A Type of Service (ToS) field of IP may be marked to indicate the QoS. IP provides an IP address identifying a NSE providing communication service to a BVC. For example, IP provides a source and destination address associated with a NSE of the BSS providing service to a BVC and the NSE of the SGSN providing service to a BVC.

The data link layer is responsible for how bits are grouped into the data packets and synchronizing the data according to a standard, for example ATM, FR or SONET. Synchronization functions also may accommodate synchronization patterns to reflect any transmission failures occurring in the physical circuit. The data link layer is responsible for building and providing the information necessary for the physical link layer to relay the data packets between two system components across a single data link. The physical link layer is a bearer channel specified for accommodating data according to the data link layer. The physical link layer is referred to as the bearer channel. The physical link layer is associated with the physical link and the control of the physical link, for example, format, power, transmission and re-transmission.

Turning now to FIG. 1B, where an IP and UDP layer utilized in Gb interface 100 having defined UDP ports differentiated between data designated as real time and non-real time services is illustrated and denoted generally as 110. A UDP port associated with a NS-VC may be identified by the QoS. For example, a UDP port (M) may be associated with a QoS identifying data as real time services, such as audio, and a UDP port (M+1) for ports associated with QoS identifying data as non-real time service, such as simple text. A ToS field of IP may be marked to indicate the QoS of an associated source and destination UDP port. Therefore, a UDP port associated with a NS-VC and indicated by the ToS provides for a more efficient and reliable system.

Turning now to FIG. 2 where a mobile communications architecture coupled with a GPRS architecture communicate according to Gb interface 100 is illustrated and denoted generally as 120. The mobile communications architecture may comprise a Base Station System (BSS) 122 for communicating with a mobile communications device, such as a GPRS enabled phone or computer. The GPRS architecture may comprise a Serving GPRS Support Node (SGSN) 124 coupled to BSS 122 allowing for the communication of data between the mobile communications architecture and a communications device residing on a Packet Data Network (PDN), such as the Internet or an intranet.

BSS 122 may be directly coupled to SGSN 124 or coupled through an intermediate network 126. Intermediate network 126 may comprise bearer channels 128 and 130 for allowing BSS 122 and SGSN 124 access to intermediate network 126. Each bearer channel 128 and 130 having NS-VL 132, 134,136 and 138 and each NS-VL having NS-VC 140,142, 144 and 146. BSS 122 and SGSN 124 utilizes Gb interface 100 to communicate data having IP information identifying a NSE providing service to a BVC over NS-VC 140,142, 144 and 146. Although each side of intermediate network 126 as illustrated only comprises one bearer channel, two NS-VL and two NS-VC, it should be understood by someone skilled in the art that intermediate network 126 may comprise multiple channels each having multiple NS-VL with each NS-VL comprising a NS-VC.

A defined geographic region serviced by BSS 122 may comprise several small geographic regions with each smaller geographic region referred to as a cell. BSS 122 may comprise a cell 148 and 150 each having a Base Transceiver Station (BTS) providing transmission and reception for mobile communication devices. BSS 122 may further comprise a Base Station Controller (BSC) for switching data to and from each BTS. In this embodiment, cell 148 is associated with BVC 152A and 152B and cell 150 is associated with BVC 154A and 154B, although in other embodiments the BVC may be associated with a BSC or a BSS. Although the mobile communications architecture and GPRS architecture is illustrated with two BVC, it should be understood by someone skilled in the art that system 120 may comprise several BVC.

NSE of Gb interface 100 utilizing UDP associates UDP ports, such as a source and destination UDP port, with NS-VC 140, 142, 144 and 146 for peer-to-peer communication between BVC 152A and 152B and peer-to-peer communication between BVC 154A and 154B. Data designated as real time or non-real time services and encapsulated with UDP having UDP ports identified as either for real time or non- real time services provides a more efficient and reliable connection between BSS 122 and SGSN 124. UDP ports are associated with NS-VC; therefore, NS-VC transporting data between BVC may be identified as handling data designated as either real time or non-real time services. Data packets encapsulated with UDP and IP may have the QoS marked in a ToS field. A particular NSE providing service to BVC 152A, 152B or 154A, 154B may be identified by an IP address, such as a source and destination IP address.

The data packet communicated between BSS 122 and SGSN 124 encapsulated with UDP and IP allows for the efficient communication of data between BSS 122 and SGSN 124 regardless of the number or types of networks and sub-networks traversed. For example, the intermediate network may require that data transmission across the intermediate network include several sub-networks with each sub-network, for example, Frame Relay, SONET, SDH or ATM or combinations thereof. Therefore, transmission of GPRS data packets between a BSS and a SGSN utilizing UDP and IP provides efficient, flexible and reliable communications regardless of the number and types of networks transmitted.

While this invention has been described with reference to particular embodiments, this description is not intended to be limiting. Various modifications and combinations of the illustrative embodiments, as well as other embodiments of the invention, will be apparent to persons skilled in the art. It is, therefore, intended that the appended claims encompass any such modifications or embodiments.

What is claimed is:

1. A method of communicating data between a base station system (BSS) and a serving GPRS support node (SGSN), the method comprising:

providing protocol data and associated functions, including encapsulating a data packet with a user datagram protocol (UDP) and a Internet Protocol (IP), wherein the user datagram protocol comprises a user datagram protocol port associated with a network service virtual connection (NS-VC) and, the Internet Protocol provides an Internet Protocol address associated with a network service entity (NSE); and transmitting the data packet provided with the protocol data.

2. The method as recited in claim 1, wherein the user datagram protocol port is identified as either for real-time or non-real time services.

3. The method as recited in claim 1, wherein the data packet is associated with a temporary logical link identifier (TLLI) and a network service access point identifier (NSAPI).

4. The method as recited in claim 3 further comprising:
providing a BSSGP virtual connection identifier (BVCI), a network service entity identifier (NSEI) and a link select parameter (LSP), the BVCI, NSEI and LSP associated with the TLLI and NSAPI, the BVCL identifying a BVC, the NSEI identifying the NSE, the NS-VC identified by the BVCI and the NSEI, the LSP identifying a network service virtual link (NS-VL) associated with the NS-VC.

5. The method as recited in claim 1, wherein the data packet comprises a sub-network dependent convergence protocol(SNDCP).

6. The method as recited in claim 5, wherein the data packet further comprises a logical link control (LLC).

7. The method as recited in claim 6, wherein protocol data and associated functions further comprise:
a base station system GPRS protocol (BSSGP);
a network service control;
a data link layer; and
a physical link layer.

8. The method a as recited in claim 7, further comprising receiving the data packet provided with the protocol data.

9. The method as recited in claim 8, further comprising removing the protocol data and associated functions and the LLC and the SNDCP.

10. The method as recited in claim 1, wherein the protocol data and associated functions further comprise:
a sub-network dependent convergence protocol (SNDCP);
a logical link control (LLC);
a base station system GPRS protocol (BSSGP);
a network service control;
a data link layer; and
a physical link layer.

11. The method as recited in claim 10, wherein the SNDCP provides RTP/UDP/IP header compression and stripping.

12. The method as recited in claim 10, further comprising receiving the data packet provided with the protocol data.

13. The method as recited in claim 12, further comprising:
removing the physical link layer, the data link layer, the IP, the UDP, the network service control and the BSSGP.

14. The method of communicating data as recited in claim 1, wherein the UDP comprises source and destination UDP ports associated with the NS-VC and the IP provides a source and destination IP address associated with the NSE.

15. A base station system for communicating data with a serving GPRS support node, the base station system comprising:
- means for providing protocol data and associated functions, including encapsulating a data packet with a user datagram protocol (UDP) and a Internet Protocol (IP), wherein the user datagram protocol comprises a user datagram protocol port associated with a network service virtual connection (NS-VC) and, the Internet Protocol provides an Internet Protocol address associated with a network service entity (NSE); and
- means for transmitting the data packet provided with the protocol data.

16. The base station system of communicating data as recited in claim 15, wherein the user datagram protocol comprises source and destination user datagram protocol ports associated with the network service virtual connection and the Internet Protocol provides a source and destination Internet Protocol address associated with the NSE.

17. A serving GPRS support Node for communicating data with a base station system, the serving GPRS support Node comprising:
- means for providing protocol data and associated functions, including encapsulating a data packet with a User Datagram Protocol (UDP) and a Internet Protocol (IP), wherein the user datagram protocol comprises a user datagram protocol port associated with a network service virtual connection (NS-VC) and, the Internet Protocol provides an Internet Protocol address associated with a network service entity (NSE); and
- means for transmitting the data packet provided with the protocol data.

18. The serving GPRS support Node of communicating data as recited in claim 17, wherein the user datagram protocol comprises source and destination user datagram protocol ports associated with the network service virtual connection and the Internet Protocol provides a source and destination Internet Protocol address associated with the NSE.

19. An apparatus, comprising:
- providing means for providing protocol data and associated functions, including encapsulating a data packet with a user datagram protocol and a Internet Protocol, wherein the user datagram protocol comprises a user datagram protocol port associated with a network service virtual connection and, the Internet Protocol provides an Internet Protocol address associated with a network service entity; and
- transmitting means for transmitting the data packet provided with the protocol data,
- wherein the apparatus communicate data between a base station system and a serving GPRS support node.

* * * * *